(12) United States Patent
DeVito et al.

(10) Patent No.: US 9,956,509 B2
(45) Date of Patent: May 1, 2018

(54) FILTER ASSEMBLY

(71) Applicant: Tenneco Automotive Operating Company Inc., Lake Forest, IL (US)

(72) Inventors: Mark DeVito, Jackson, MI (US); Dan McAninch, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 226 days.

(21) Appl. No.: 15/075,803

(22) Filed: Mar. 21, 2016

(65) Prior Publication Data

US 2017/0266594 A1    Sep. 21, 2017

(51) Int. Cl.

| | |
|---|---|
| *B01D 29/58* | (2006.01) |
| *B01D 29/44* | (2006.01) |
| *B01D 29/66* | (2006.01) |
| *B05B 15/00* | (2018.01) |
| *F01N 3/20* | (2006.01) |
| *F02M 37/22* | (2006.01) |
| *F02M 61/16* | (2006.01) |

(52) U.S. Cl.
CPC ............ *B01D 29/58* (2013.01); *B01D 29/44* (2013.01); *B01D 29/66* (2013.01); *B05B 15/008* (2013.01); *F01N 3/2066* (2013.01); *F02M 37/22* (2013.01); *F02M 61/165* (2013.01); *F01N 2610/02* (2013.01); *F01N 2610/1426* (2013.01); *F01N 2610/1453* (2013.01)

(58) Field of Classification Search
None
See application file for complete search history.

(56) References Cited

U.S. PATENT DOCUMENTS

| | | | | |
|---|---|---|---|---|
| 5,584,999 A | * | 12/1996 | Cooke | B01D 29/44 210/439 |
| 5,996,908 A | * | 12/1999 | Hofmann | F02M 61/165 239/533.3 |
| 6,536,417 B2 | * | 3/2003 | Pearlman | F02M 55/005 123/470 |

* cited by examiner

*Primary Examiner* — Chester T Barry
(74) *Attorney, Agent, or Firm* — Harness, Dickey & Pierce, P.L.C.

(57) ABSTRACT

A filter assembly may include an outer insert and an inner insert. The outer insert having an aperture and a plurality of outer grooves. The outer grooves are formed in a radially outer periphery of the outer insert and are separated from each other and the aperture. The inner insert may be disposed within the aperture. A plurality of inner grooves may be formed in a radially outer periphery of the inner insert. Each of the outer and inner grooves may have a closed axial end and an open axial end.

26 Claims, 4 Drawing Sheets

FILTER ASSEMBLY

FIELD

The present disclosure relates to a filter assembly, and more particularly, to an edge filter assembly.

BACKGROUND

This section provides background information related to the present disclosure and is not necessarily prior art.

A filter can be used to protect sensitive equipment (e.g., injectors or pumps) by removing particles, debris and/or contamination from fluids (e.g., diesel fuel, urea, water, oil, etc.) prior to entering sensitive components of such equipment. Edge filters have been used in diesel fuel injectors to remove particles from diesel fuel. Conventional edge filters are generally simple and robust and have generally performed adequately for many applications. Continuous improvement in the edge filter field is desirable, as improvements in filtration performance (filtration particle size, flow rate through the filter, etc.) can improve the performance and efficiency of the products in which they are incorporated.

SUMMARY

This section provides a general summary of the disclosure, and is not a comprehensive disclosure of its full scope or all of its features.

In one form, the present disclosure provides a filter assembly that may include an outer insert and an inner insert. The outer insert may include an aperture and a plurality of outer grooves. The outer grooves are formed in a radially outer periphery of the outer insert and are separated from each other. The inner insert may be disposed within the aperture. A plurality of inner grooves may be formed in a radially outer periphery of the inner insert. Each of the outer and inner grooves may have a closed axial end and an open axial end.

In some configurations, the outer and inner inserts are concentric with each other.

In some configurations, the outer and inner inserts are generally cylindrical.

In some configurations, surfaces defining the inner grooves cooperate with a diametrical surface of the aperture to form a plurality of fluid channels.

In some configurations, the inner insert is press fit within the aperture.

In some configurations, the inner and outer inserts have the same axial length.

In some configurations, the inner and outer inserts have different axial lengths.

In some configurations, the outer and inner inserts are formed from an impermeable material.

In some configurations, one or more of the outer grooves is a first outer groove and one or more of the outer grooves is a second outer groove. The open axial ends of the first outer grooves may be disposed at a first axial end of the outer insert, and the open axial ends of the second outer grooves are disposed at a second axial end of the outer insert.

In some configurations, each first outer groove is disposed angularly between adjacent second outer grooves.

In some configurations, outer gaps provide fluid communication between adjacent first and second outer grooves. The outer gaps may be sized to prevent particles having a predetermined size from passing from the first outer grooves to the second outer grooves.

In some configurations, one or more of the inner grooves is a first inner groove and one or more of the inner grooves is a second inner groove. The open axial ends of the first inner grooves may be disposed at a first axial end of the inner insert, and the open axial ends of the second inner grooves may be disposed at a second axial end of the inner insert.

In some configurations, each first inner groove is disposed angularly between adjacent second inner grooves.

In some configurations, a plurality of inner gaps are disposed radially between the inner insert and an inner diametrical surface of the aperture. The inner gaps may provide fluid communication between adjacent first and second grooves and may be sized to prevent particles having a predetermined size from passing from the first inner grooves to the second inner grooves.

In some configurations, the filter assembly may be incorporated into an injector (e.g., a fuel injector, a reductant injector, etc.) including a conduit having the filter assembly disposed therein.

In another form, the present disclosure provides an edge filter assembly that may include an outer insert and an inner insert. The outer insert may have a cylindrical first body and first and second flanges disposed at axial ends of the first body. The outer insert may include an aperture extending through the first body and the first and second flanges. The outer insert may include a plurality of outer grooves. The outer grooves may be formed in a radially outer periphery of the outer insert and are separated from each other. The first body may include an outermost diameter that is smaller than outermost diameters of the first and second flanges. The inner insert may be disposed within the aperture and may have a cylindrical second body and third and fourth flanges disposed at axial ends of the second body. The third and fourth flanges may be pressed into engagement with a diametrical surface of the aperture. The inner insert including a plurality of inner grooves formed in a radially outer periphery of the inner insert. Each of the outer and inner grooves may have a closed axial end and an open axial end. The second body may have an outermost diameter that is smaller than outermost diameters of the third and fourth flanges. Surfaces defining the inner grooves may cooperate with the diametrical surface of the aperture to form a plurality of fluid channels.

In some configurations, the outer and inner inserts are concentric with each other.

In some configurations, the outer and inner inserts are generally cylindrical.

In some configurations, the inner insert is press fit within the aperture.

In some configurations, the inner and outer inserts have the same axial length.

In some configurations, the inner and outer inserts have different axial lengths.

In some configurations, the outer and inner inserts are formed from an impermeable material.

In some configurations, one or more of the outer grooves is a first outer groove and one or more of the outer grooves is a second outer groove. The open axial ends of the first outer grooves may be disposed at a first axial end of the outer insert, and the open axial ends of the second outer grooves may be disposed at a second axial end of the outer insert.

In some configurations, each first outer groove is disposed angularly between adjacent second outer grooves.

In some configurations, outer gaps defined by radially outermost surfaces of the first body provide fluid communication between adjacent first and second outer grooves.

The outer gaps may be sized to prevent particles having a predetermined size from passing from the first outer grooves to the second outer grooves.

In some configurations, one or more of the inner grooves is a first inner groove and one or more of the inner grooves is a second inner groove. The open axial ends of the first inner grooves may be disposed at a first axial end of the inner insert, and the open axial ends of the second inner grooves may be disposed at a second axial end of the inner insert.

In some configurations, each first inner groove is disposed angularly between adjacent second inner grooves.

In some configurations, a plurality of inner gaps are disposed radially between radially outermost surfaces of the second body and the diametrical surface of the aperture. The inner gaps may provide fluid communication between adjacent first and second grooves and may be sized to prevent particles having a predetermined size from passing from the first inner grooves to the second inner grooves.

In some configurations, the edge filter assembly may be incorporated into an injector (e.g., a fuel injector, a reductant injector, etc.). The injector may include a conduit having the edge filter assembly disposed therein. An inner diametrical surface of the conduit may cooperate with the radially outermost surfaces of the first body to define the outer gaps such that the outer gaps are disposed radially between the inner diametrical surface of the conduit and the radially outermost surfaces of the first body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
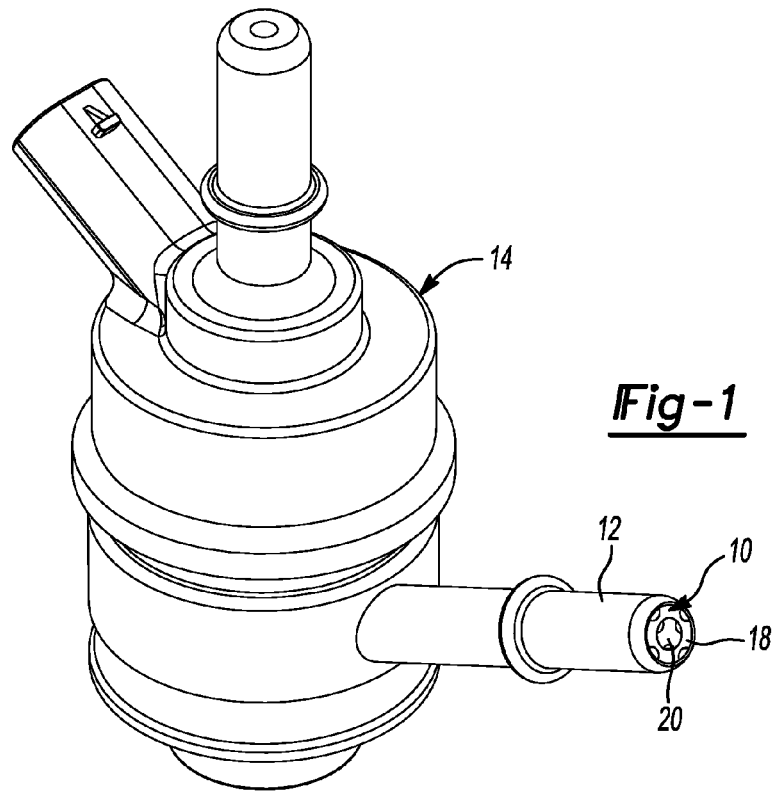
FIG. 1 is a perspective view of an injector having a filter assembly according to the principles of the present disclosure.
Figure 2:
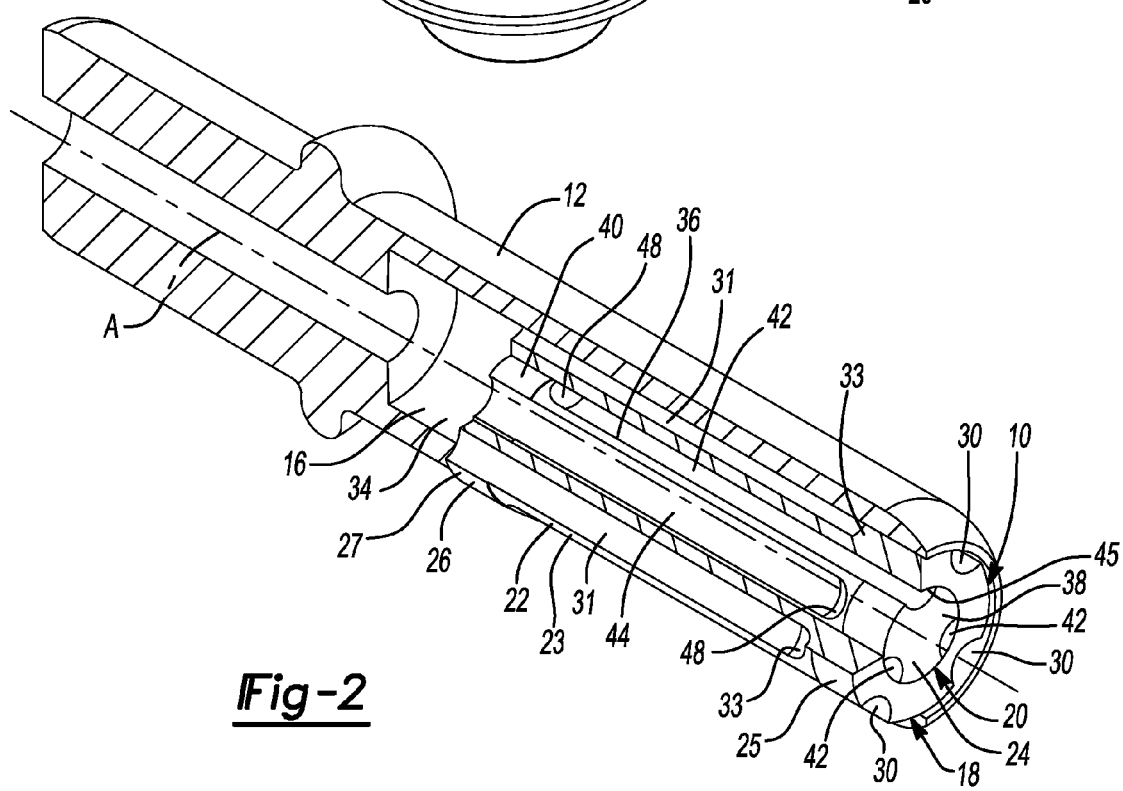
FIG. 2 is a perspective cross-sectional view of a fluid connector of the injector and the filter assembly.
Figure 3:
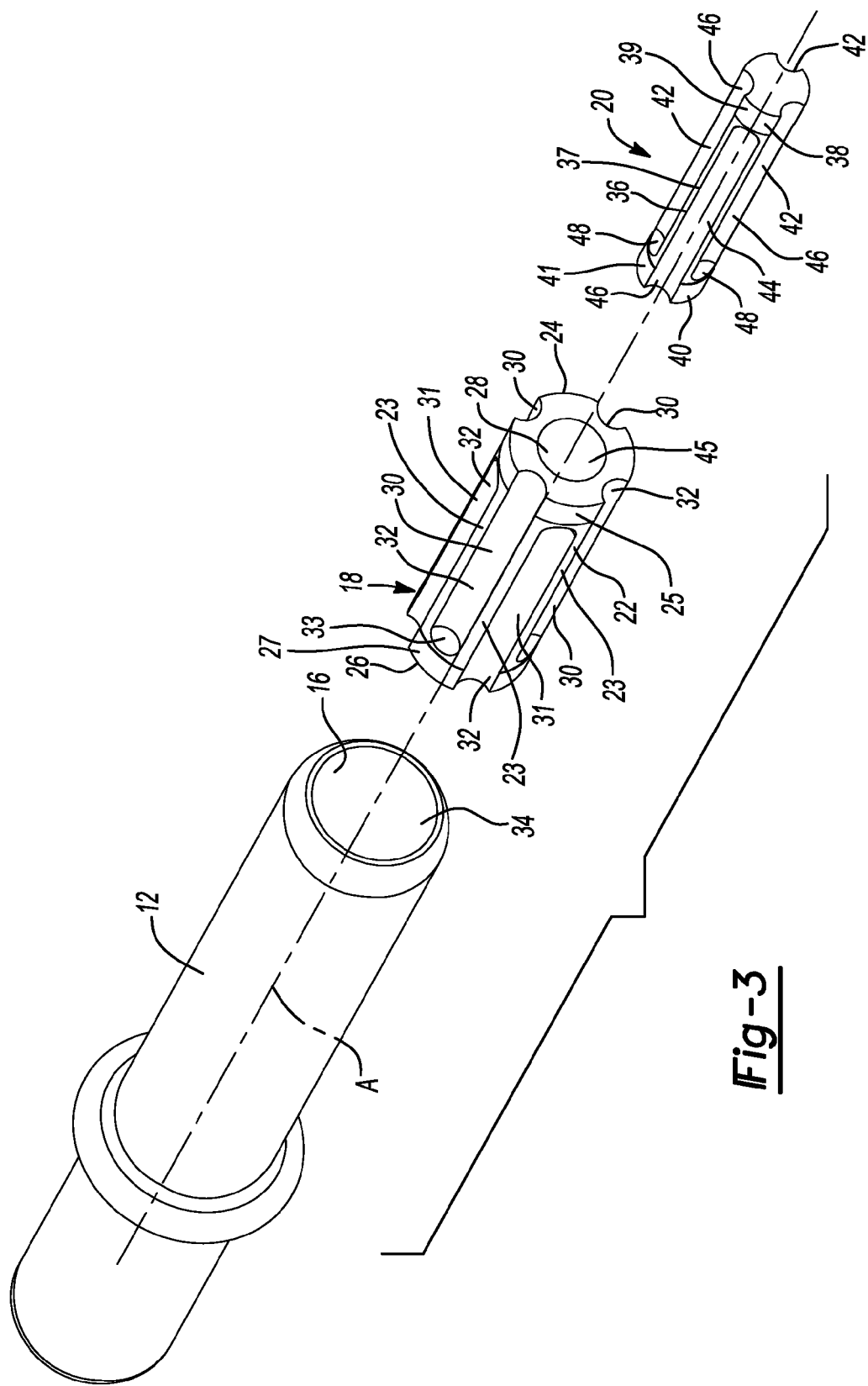
FIG. 3 is an exploded perspective view of the fluid connector and the filter assembly.
Figure 4:
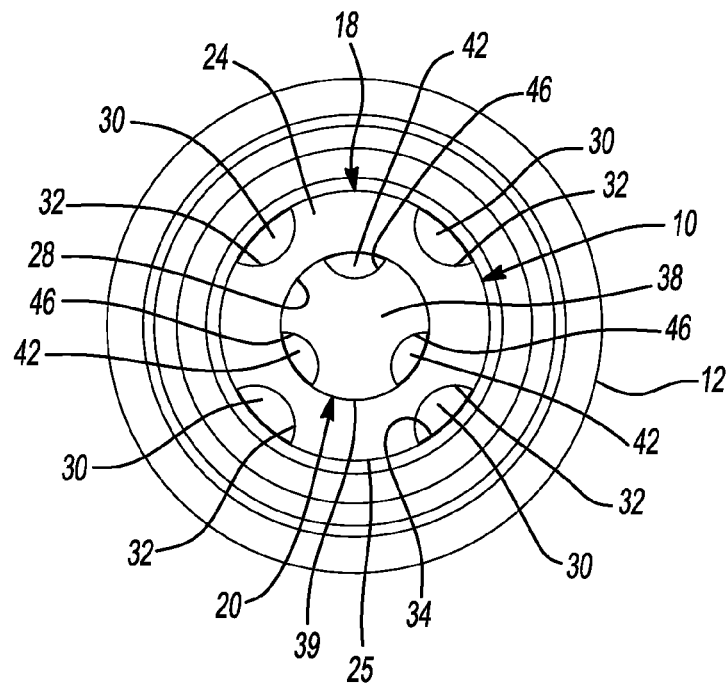
FIG. 4 is an end view of the fluid connector and the filter assembly.
Figure 5:
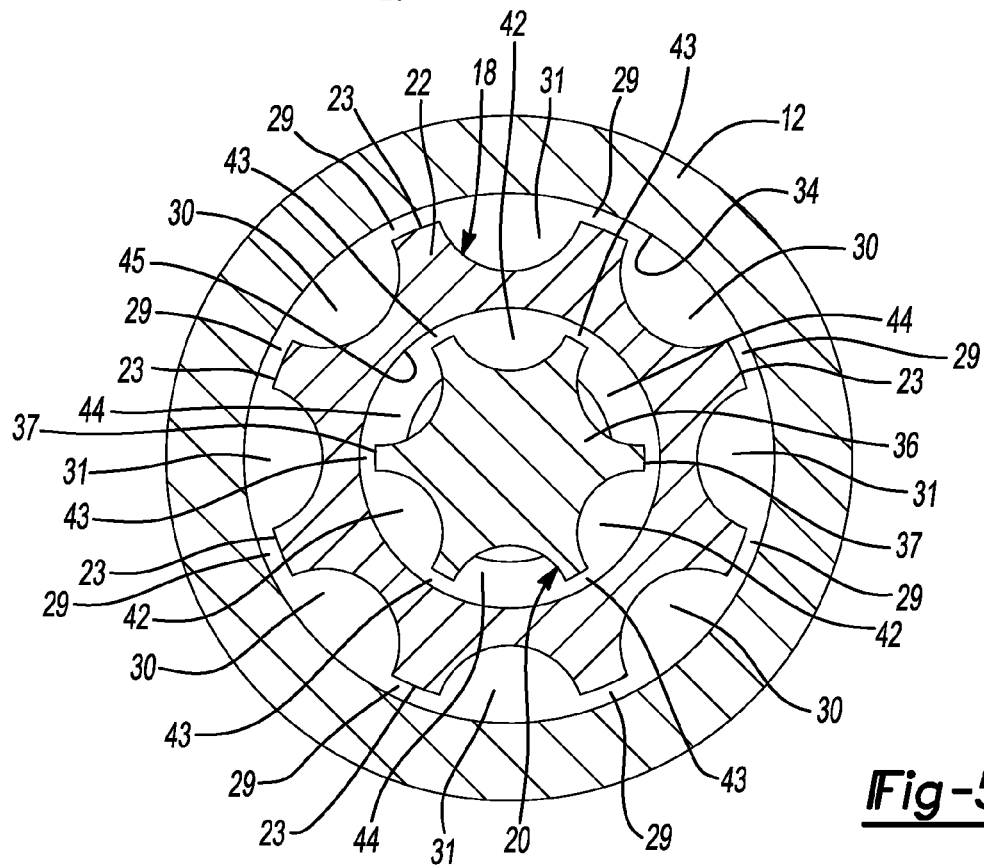
FIG. 5 is a cross-sectional view of the fluid connector and the filter assembly.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, an edge filter assembly 10 is provided that may be installed in a fluid connector 12 (e.g., a generally tubular inlet conduit) of an injector 14 (FIG. 1) or a pump (not shown), for example. The edge filter assembly 10 may be pressed into an inlet passage 16 of the fluid connector 12 and may filter contaminants (e.g., foreign particles) from a fluid (urea, water, diesel fuel or oil, for example) before the fluid enters the injector 14 or pump.

The edge filter assembly 10 may include an outer insert 18 and an inner insert 20 nested within the outer insert 18. The outer and inner inserts 18, 20 may be formed entirely from an impermeable solid steel material, for example, and/or any other suitable impermeable metallic, polymeric or composite material. The steel material allows for reliable operation of the filter assembly 10 at high fluid temperatures and pressures.

The outer insert 18 may have a generally cylindrical main body 22 having first and second flanges 24, 26 disposed at respective longitudinal ends of the main body 22. The main body 22 may also include a central aperture 28, a plurality of first grooves 30 and a plurality of second grooves 31. The central aperture 28 may extend entirely through the main body 22 and the flanges 24, 26 and may be centered on a longitudinal axis A (FIGS. 2 and 3) of the main body 22 and the filter assembly 10.

The grooves 30, 31 may be arranged in a circular pattern around the longitudinal axis A and may extend longitudinally parallel to the longitudinal axis A. Curved surfaces 32 (FIGS. 3 and 4) of the grooves 30, 31 are portions of the radially outer periphery of the outer insert 18 such that the curved surfaces 32 cooperate with an inner diametrical surface 34 of the fluid connector 12 to form channels through which fluid flows. The grooves 30, 31 only extend through a portion of the axial length of the outer insert 18. That is, each flange 24, 26 may define an axial end wall 33 (FIGS. 2 and 3) of one of the grooves 30, 31. In this manner, the first grooves 30 extend axially through the first flange 24 and end axially at the second flange 26, and the second grooves 31 extend through the second flange 26 and end axially at the first flange 24. Each of the first grooves 30 is disposed angularly between adjacent second grooves 31 (i.e., the grooves 30, 31 are disposed in an alternating arrangement).

Radially outermost surfaces 25, 27 of the flanges 24, 26 are press fit into engagement with the inner diametrical surface 34 of the fluid connector 12. The radially outermost surfaces 25, 27 of the flanges 24, 26 may have a slightly larger diameter than the radially outermost surfaces 23 of the main body 22. In this manner, gaps 29 (FIG. 5) may exist between the inner diametrical surface 34 and the radially outermost surfaces 23 of the main body 22. As will be described in more detail below, the gaps 29 provide fluid communication between adjacent grooves 30, 31 and a sufficiently small in width (i.e., the direction that is perpendicular to the longitudinal axis A and extends from surface 23 to surface 34) so as to allow fluid flow therethrough while preventing particles entrained in the fluid from passing therethrough, thereby filtering the particles out of the fluid. It should be appreciated that the widths (i.e., the dimensions extending radially from the surfaces 23 to the surface 34) of the gaps 29 may not be shown to scale in FIG. 5. Rather, the widths of the gaps 29 shown in FIG. 5 have been enlarged in order to make the gaps 29 more easily seen in FIG. 5.

The inner insert 20 may have a generally cylindrical main body 36 having first and second flanges 38, 40 disposed at respective longitudinal ends of the main body 36. The main body 36 may also include a plurality of first grooves 42 and a plurality of second grooves 44.

The grooves 42, 44 may be arranged in a circular pattern around the longitudinal axis A and may extend longitudinally parallel to the longitudinal axis A. Curved surfaces 46 (FIGS. 3 and 4) of the grooves 42, 44 are portions of the radially outer periphery of the inner insert 20 such that the curved surfaces 46 cooperate with an inner diametrical surface of the central aperture 28 of the outer insert 18 to form channels through which fluid flows. The grooves 42, 44 only extend through a portion of the axial length of the inner insert 20. That is, each flange 38, 40 may define an axial end wall 48 (FIGS. 2 and 3) of one of the grooves 42, 44. In this manner, the first grooves 42 extend axially through the first flange 38 and end axially at the second flange 40, and the second grooves 44 extend through the second flange 40 and end axially at the first flange 38. Each of the first grooves 42 is disposed angularly between adjacent second grooves 44 (i.e., the grooves 42, 44 are disposed in an alternating arrangement).

Radially outermost surfaces 39, 41 of the flanges 38, 40 are press fit into engagement with the inner diametrical surface of the central aperture 28 of the outer insert 18. The radially outermost surfaces 39, 41 of the flanges 38, 40 may have a slightly larger diameter than the radially outermost surfaces 37 of the main body 36. In this manner, gaps 43 (FIG. 5) may exist between the inner diametrical surface 45 of the aperture 28 of the outer insert 18 and the radially outermost surfaces 37 of the main body 36 of the inner insert 20. As will be described in more detail below, the gaps 43 provide fluid communication between adjacent grooves 42, 44 and a sufficiently small in width (i.e., the direction that is perpendicular to the longitudinal axis A and extends from surface 37 to surface 45) so as to allow fluid flow therethrough while preventing particles entrained in the fluid from passing therethrough, thereby filtering the particles out of the fluid.—It should be appreciated that the widths (i.e., the dimensions extending radially from the surfaces 37 to the surface 45) of the gaps 43 may not be shown to scale in FIG. 5. Rather, the widths of the gaps 43 shown in FIG. 5 have been enlarged in order to make the gaps 43 more easily seen in FIG. 5.

In the particular configuration shown in FIGS. 1-5, axial ends of the inner insert 20 are substantially flush with axial ends of the outer insert 18. That is, the outer and inner inserts 18, 20 shown in FIGS. 1-5 have the same axial lengths (i.e., the same lengths in a direction along or parallel to the longitudinal axis A).

With continued reference to FIGS. 1-5, operation of the filter assembly 10 will be described in detail. Fluid entering the injector 14 through the inlet of the fluid connector 12 flows through the filter assembly 10, where particles and/or other contaminants are filtered out of the fluid. The fluid entering the fluid connector 12 may flow into the channels defined by the first grooves 30 of the outer insert 18 and the channels defined by the first grooves 42 of the inner insert 20. Fluid in the channels defined by the first grooves 30 of the outer insert 18 may then flow through gaps 29 (i.e., the gaps between the inner diametrical surface 34 of the fluid connector 12 and the radially outermost surfaces 23 of the main body 22 of the outer insert 18) and into the channels defined by the second grooves 31 of the outer insert 18. Likewise, fluid in the channels defined by the first grooves 42 of the inner insert 20 may then flow through gaps 43 (i.e., the gaps between the inner diametrical surface 45 of the aperture 28 of the outer insert 18 and the radially outermost surfaces 37 of the main body 36 of the inner insert 20) and into the channels defined by the second grooves 44 of the inner insert 20.

As described above, the gaps 29, 43 are large enough to allow liquid to pass therethrough from the first grooves 30, 42 to the second grooves 31, 44, but the gaps 29, 43 are small enough so that particles of predetermined sizes that are entrained in the fluid cannot pass therethrough with the liquid. In this manner, particles of the predetermined size and larger will be filtered out of the fluid as the fluid passes through the gaps 29, 43. The particles filtered out of the fluid may accumulate in the first grooves 30, 42.

Having the inner insert 20 nested within the outer insert 18 increases the filtering capacity of the filter assembly 10. That is, by nesting the inner insert 20 within the outer insert 18, the filtering gap area (i.e., the area of the gaps through which fluid can pass but through which particles cannot pass) is increased without increasing the axial length (i.e., the length along the longitudinal axis A) of the filter assembly 10. This increased filtering gap area allows for a higher flow rate through the filter assembly 10. In some examples, nesting the inner insert 20 within the outer insert 18 as described above nearly doubles the filtration capacity of the filter assembly 10 (relative to the filtration area of a conventional edge filter having the same length and diameter as the outer insert 18) without increasing the amount of space that the filter assembly 10 occupies within the fluid connector 12.

In some configurations, the sizes of the gaps 29, 43 may be substantially the same so that the gaps 29, 43 filter particles of substantially the same size. In some configurations, the gaps 43 the inner insert 20 could be larger or smaller than the gaps 29 of the outer insert 18 such that the outer and inner inserts 18, 20 have different filtration properties (e.g., flow rate and filtration particle size) such that particles of a given size will pass through the gaps 29 of the outer insert 20 but not the gaps 43 of the inner insert 18 or vice versa.

In some applications, a pump that forces the fluid through the filter assembly 10 can be reversed (i.e., operated in a manner that reverses the direction of fluid flow through the fluid connector 12) to purge particles and contaminants that have accumulated within the filter assembly 10. In this manner, particles and contaminants that have accumulated within the channels defined by the first grooves 30, 42 can be forced out of the inlet of the fluid connector 12.

Figure 6:
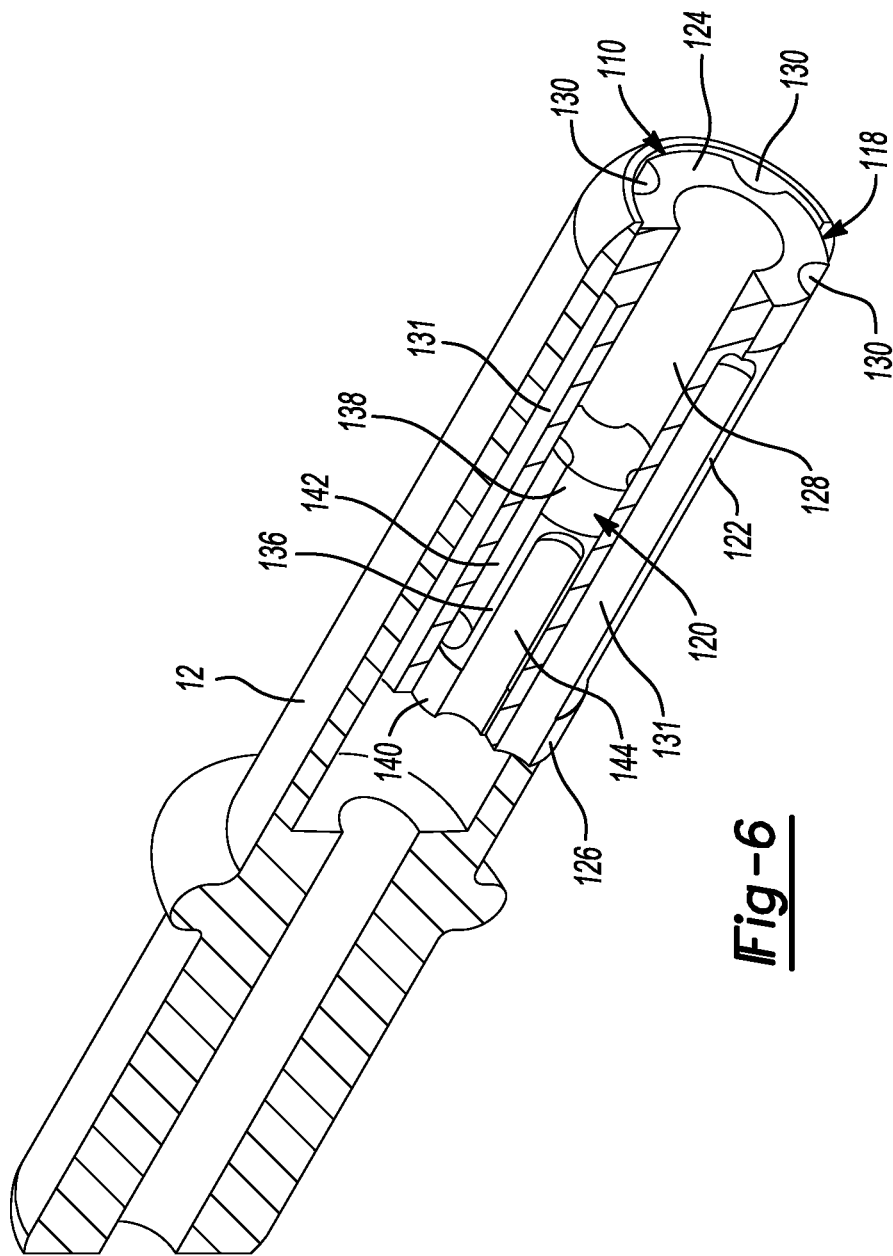
FIG. 6 is a perspective cross-sectional view of an another filter assembly installed in a fluid connector.

With reference to FIG. 6, another edge filter assembly 110 is provided that could be installed in the fluid connector 12 instead of or in addition to the filter assembly 10. The filter assembly 110 may include an outer insert 118 and an inner insert 120 nested within the outer insert 118. The structure and function of the outer insert 118 and the inner insert 120 may be similar or identical to that of the outer and inner inserts 18, 20 described above. Therefore, similar features will not be described again in detail.

Like the outer insert 18, the outer insert 118 may include a generally cylindrical main body 122 having first and second flanges 124, 126 disposed at respective longitudinal ends of the main body 122. The main body 122 may also include a central aperture 128, a plurality of first grooves 130 and a plurality of second grooves 131. As described above, the outermost diameter of the flanges 124, 126 may be larger than the outermost diameter of the main body 122.

Similar to the inner insert 20, the inner insert 120 may include a generally cylindrical main body 136 having first and second flanges 138, 140 disposed at respective longitudinal ends of the main body 136. The main body 136 may also include a plurality of first grooves 142 and a plurality of second grooves 144. As described above, the outermost diameter of the flanges 138, 140 may be larger than the outermost diameter of the main body 136.

The inner insert 120 may have an axial length that is less than the axial length of the outer insert 118. In the configuration shown in FIG. 6, the second flange 140 of the inner insert 120 may be substantially flush with the second flange 126 of the outer insert 118. The first flange 138 of the inner insert 120 may be axially spaced apart from the first flange 124 of the outer insert 118 such that, during operation of the injector 14, a portion of the central aperture 128 of the outer insert 118 between the first flanges 124, 138 acts as a pocket in which relatively large particles and debris can collect.

In some configurations of the filter assemblies 10, 110, one or more additional inserts could be nested within the inner insert 20, 120 and/or the outer and inner inserts 18, 118, 20, 120 could be nested within one or more additional inserts.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A filter assembly comprising:
   a cylindrical outer insert having an aperture and a plurality of outer grooves, the outer grooves are formed in a radially outer periphery of the outer insert and are separated from each other; and
   a cylindrical inner insert disposed within the aperture and having a plurality of inner grooves formed in a radially outer periphery of the inner insert, each of the outer and inner grooves having a closed axial end and an open axial end.

2. The filter assembly of claim 1, wherein the outer and inner inserts are concentric with each other.

3. The filter assembly of claim 1, wherein surfaces defining the inner grooves cooperate with a diametrical surface of the aperture to form a plurality of fluid channels.

4. The filter assembly of claim 1, wherein the inner insert is press fit within the aperture.

5. The filter assembly of claim 1, wherein the inner and outer inserts have the same axial length.

6. The filter assembly of claim 1, wherein the inner and outer inserts have different axial lengths.

7. The filter assembly of claim 1, wherein the outer and inner inserts are formed from an impermeable material.

8. The filter assembly of claim 1, wherein one or more of the outer grooves is a first outer groove and one or more of the outer grooves is a second outer groove, and wherein the open axial ends of the first outer grooves are disposed at a first axial end of the outer insert, and the open axial ends of the second outer grooves are disposed at a second axial end of the outer insert.

9. The filter assembly of claim 8, wherein each first outer groove is disposed angularly between adjacent second outer grooves.

10. The filter assembly of claim 9, wherein outer gaps provide fluid communication between adjacent first and second outer grooves, and wherein the outer gaps are sized to prevent particles having a predetermined size from passing from the first outer grooves to the second outer grooves.

11. The filter assembly of claim 1, wherein one or more of the inner grooves is a first inner groove and one or more of the inner grooves is a second inner groove, and wherein the open axial ends of the first inner grooves are disposed at a first axial end of the inner insert, and the open axial ends of the second inner grooves are disposed at a second axial end of the inner insert.

12. The filter assembly of claim 11, wherein each first inner groove is disposed angularly between adjacent second inner grooves.

13. The filter assembly of claim 12, wherein a plurality of inner gaps are disposed radially between the inner insert and an inner diametrical surface of the aperture, and wherein the inner gaps provide fluid communication between adjacent first and second grooves and are sized to prevent particles having a predetermined size from passing from the first inner grooves to the second inner grooves.

14. An injector including a conduit having the filter assembly of claim 1 disposed therein.

15. An edge filter assembly comprising:
an outer insert having a cylindrical first body and first and second flanges disposed at axial ends of the first body, the outer insert including an aperture extending through the first body and the first and second flanges, the outer insert including a plurality of outer grooves, the outer grooves are formed in a radially outer periphery of the outer insert and are separated from each other, the first body having an outermost diameter that is smaller than outermost diameters of the first and second flanges; and
an inner insert disposed within the aperture and having a cylindrical second body and third and fourth flanges disposed at axial ends of the second body, the third and fourth flanges are pressed into engagement with a diametrical surface of the aperture, the inner insert including a plurality of inner grooves formed in a radially outer periphery of the inner insert, each of the outer and inner grooves having a closed axial end and an open axial end, the second body having an outermost diameter that is smaller than outermost diameters of the third and fourth flanges, wherein surfaces defining the inner grooves cooperate with the diametrical surface of the aperture to form a plurality of fluid channels.

16. The edge filter assembly of claim 15, wherein the outer and inner inserts are concentric with each other.

17. The edge filter assembly of claim 15, wherein the inner and outer inserts have the same axial length.

18. The edge filter assembly of claim 15, wherein the inner and outer inserts have different axial lengths.

19. The edge filter assembly of claim 15, wherein the outer and inner inserts are formed from an impermeable material.

20. The edge filter assembly of claim 15, wherein one or more of the outer grooves is a first outer groove and one or more of the outer grooves is a second outer groove, and wherein the open axial ends of the first outer grooves are disposed at a first axial end of the outer insert, and the open axial ends of the second outer grooves are disposed at a second axial end of the outer insert.

21. The edge filter assembly of claim 20, wherein each first outer groove is disposed angularly between adjacent second outer grooves.

22. The edge filter assembly of claim 21, wherein outer gaps defined by radially outermost surfaces of the first body provide fluid communication between adjacent first and second outer grooves, and wherein the outer gaps are sized to prevent particles having a predetermined size from passing from the first outer grooves to the second outer grooves.

23. The edge filter assembly of claim 22, wherein one or more of the inner grooves is a first inner groove and one or more of the inner grooves is a second inner groove, and wherein the open axial ends of the first inner grooves are disposed at a first axial end of the inner insert, and the open axial ends of the second inner grooves are disposed at a second axial end of the inner insert.

24. The edge filter assembly of claim 23, wherein each first inner groove is disposed angularly between adjacent second inner grooves.

25. The edge filter assembly of claim 24, wherein a plurality of inner gaps are disposed radially between radially outermost surfaces of the second body and the diametrical surface of the aperture, and wherein the inner gaps provide fluid communication between adjacent first and second grooves and are sized to prevent particles having a predetermined size from passing from the first inner grooves to the second inner grooves.

26. An injector including a conduit having the edge filter assembly of claim 25 disposed therein, wherein an inner diametrical surface of the conduit cooperates with the radially outermost surfaces of the first body to define the outer gaps such that the outer gaps are disposed radially between the inner diametrical surface of the conduit and the radially outermost surfaces of the first body.

* * * * *